(12) United States Patent
Wyss

(10) Patent No.: US 12,474,032 B2
(45) Date of Patent: Nov. 18, 2025

(54) DUAL EFFECTS LIGHTING DEVICE

(71) Applicant: John Raymond Wyss, Chehalis, WA (US)

(72) Inventor: John Raymond Wyss, Chehalis, WA (US)

(*) Notice: Subject to any disclaimer, the term of this patent is extended or adjusted under 35 U.S.C. 154(b) by 0 days.

(21) Appl. No.: 17/803,492

(22) Filed: Aug. 8, 2022

(65) Prior Publication Data

US 2024/0044474 A1    Feb. 8, 2024

(51) Int. Cl.
| | |
|---|---|
| *F21V 5/08* | (2006.01) |
| *F21V 3/02* | (2006.01) |
| *F21V 13/04* | (2006.01) |
| *F21W 121/00* | (2006.01) |
| *F21Y 115/10* | (2016.01) |

(52) U.S. Cl.
CPC ............. *F21V 5/08* (2013.01); *F21V 3/02* (2013.01); *F21V 13/04* (2013.01); *F21V 2200/13* (2015.01); *F21W 2121/008* (2013.01); *F21Y 2115/10* (2016.08)

(58) Field of Classification Search
CPC ......... F21V 33/006; F21V 2200/00–17; F21V 3/14–24; A45B 3/02–04; F21S 10/005; F21S 13/06; G09F 9/305
See application file for complete search history.

(56) References Cited

U.S. PATENT DOCUMENTS

| | | | | |
|---|---|---|---|---|
| 4,415,953 A | * | 11/1983 | Shepherd | F21V 17/101 362/450 |
| 6,042,242 A | * | 3/2000 | Chang | G02B 6/0001 362/276 |
| 6,382,825 B1 | * | 5/2002 | Wainwright | E04H 15/10 362/576 |
| 2014/0223657 A1 | * | 8/2014 | Hentschel | E04H 15/003 4/476 |
| 2020/0158303 A1 | * | 5/2020 | Goldmeier | F21S 10/005 |

FOREIGN PATENT DOCUMENTS

| | | | | | |
|---|---|---|---|---|---|
| GB | 2454716 A | * | 5/2009 | | G02B 6/04 |
| JP | 10052304 A | * | 2/1998 | | |
| WO | WO-2006107289 A1 | * | 10/2006 | | A45B 3/04 |

* cited by examiner

*Primary Examiner* — Mariceli Santiago

(57) ABSTRACT

A novel lighting device is provided which projects two simultaneous yet distinct lighting effects to its surrounding areas from a central mounted and covered light source, firstly illuminating a proximate surface directly by the light source and by reflection of a cover, and secondly light is remotely provided by optically conductive materials which transmit and project light, such that the central light source projects onto proximate surface areas directly and by reflection, and light projects remotely and outwardly, carried from said source by light transmission utilizing optically conductive materials.

10 Claims, 5 Drawing Sheets

DUAL EFFECTS LIGHTING DEVICE

BACKGROUND OF THE INVENTION

This invention relates generally to innovation by design in decorative and functional indoor and outdoor lighting devices, and in light transmission method technology by optically conductive materials such as fiber optics and other optical substrates which are used in light transmission and projection. The fields are well established, and extensive known art exists in either category. Optic fiber is known for diverse light transmission effects and are designed as used herein for further decorative and functional purposes. Similarly other optically conductive materials and substrates such as acrylic, Plexiglas, plain glass and methyl carbonate type plastics can be similarly utilized in applications of design as shown herein.

New uses of these materials in the design are freshly disclosed, but many novel lighting effects are anticipated by designs produced by the dual lighting method described herein, wherein direct and remote lighting is provided by a central source for decorative, practical and highly functional uses.

LED lighting is the primary source of light production in the present invention. Specifically, light is provided to both proximate and remote areas by a central source, an aspect of this novel invention in its design and unique nature. It is assumed the reader and users have basic knowledge of lighting, L.E.D.s and the numerous and various optics known in prior art.

Objects and Advantages of the Invention

The present invention provides a new and novel use of fiber optics and like materials with light conducting properties because a central light source provides a dual lighting effect. Generally, the object of the invention is to develop simultaneous uses of both of the following lighting effects:
1) A covered and mounted or suspended light source whereby proximate objects and surfaces are illuminated and;
2) An integral connection by a main light source to an optical conduit and conductor of light whereby transmission of light enables lighting effects remote of said light source.

Advantages of the invention are greatly increased decorative and practical lighting options enabled by multiple possibilities utilizing this novel system, whereby a central lighting source simultaneously and simply illuminates both local and proximate objects and surfaces, and remotely projects by transmission through optic fiber or other optically conductive material, providing both proximate and remote decorative and functional illuminations. Further advantages include low cost, lightweight, simplicity in operation and installation and a huge array of beautiful and very functional lighting effects.

SUMMARY OF THE INVENTION

A novel and efficient design is taught herein that relates to decorative and functional lighting devices for use inside and around residential or business and commercial buildings. This is achieved by utilizing high intensity light which is generated by at least one light source, such as an ordinary common bright bulb or a light emitting diode (LED) wherein said light source is covered, mounted or suspended, lighting a surface. Integral optic contact is established to optically conductive material such as fiber optic strands, or prospectively any other medium of light transmitting material. In this explanation the preferred embodiment is comprised of 1) a LED light source with power supply; 2) a cover for said light source which reflects light and is mounted proximate to a surface and; 3) optic fiber strands connected to and illuminated by said light source, extending remotely from said cover. The various parts are assembled as shown in following illustrations and descriptions of devices which create dual lighting effects, simultaneously illuminating a surface and providing lighting effects to remote areas.

Drawings illustrating basic devices according to the novel method are shown, followed by suggestions of a few other useful embodiments which are envisioned by the inventor.

Those with knowledge in the field will anticipate numerous obvious designs and uses. In the interest of brevity and with a focus on novelty, not all are illustrated herein.

DRAWINGS AND DESCRIPTION

Figure 1:
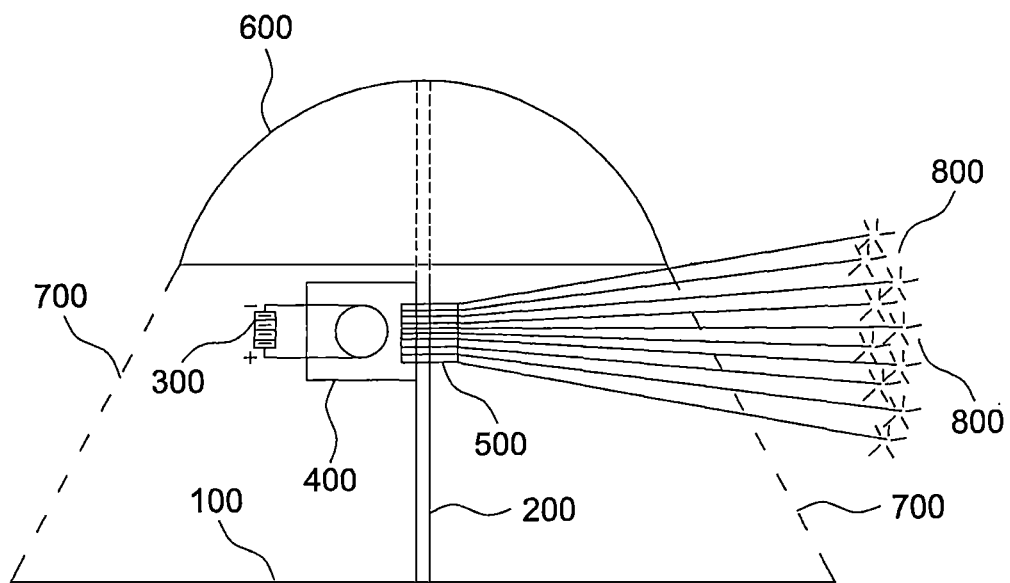
FIG. 1 is a cross-section view showing details of Dual Effects Lighting Device.

FIG. 1, a preferred embodiment is illustrated. The invention is an uncomplicated device comprised of five basic components assembled and suspended whereby the intended lighting functions are provided. The device is mounted proximate to a surface, 100, by suspension upon a central support pole, 200, originating at and extending from the surface, 100. Said support pole, 200, serves as a mount to the components as described in the preferred embodiment. The preferred embodiment, as in all of the novel devices envisioned, employs an electrical power supply source. In the embodiment, FIG. 1, it is a battery, 300. It is noted that variations may employ other means of power supply having proper voltage and amperage to adequately power a sufficiently bright light source, which in the preferred embodiment is one light-emitting-diode (L.E.D.), 400, which emits high-intensity light. Numerous forms of direct-current batteries will power such a light source. Out-of-doors a solar battery is a possible alternative. A necessary component of the device is at least one light-emitting-diode (L.E.D.), 400, or a similar high intensity light. Light shines as openly and unobstructed as possible except for a portion of the light source having integral contact with a light conduit, 500, for purposes of light transmission and remote projection. In the preferred embodiment an optically conductive bundle of fiber optic strands, 500, contacts the L.E.D., 400, and extends from the pole. A cover, 600, contains the assembly. Open and unbundled fiber optic strands, 500, conduct light and project light, 800, like stars from ends of all fiber optic strands. Clear glass or acrylic plastics have optical transmission qualities and are conduits.

Shown in the next illustrations are examples of designs for remote projection, an important object of this invention. The last component is a cover, 600, a dome confining and reflecting light toward the surface. Cover is mounted upon the pole, 200. Light source, 400, is between cover, 600, and surface, 100. Cover, 600, confines light and reflects from concave area that faces light source, 400, and surface, 100, so as to shine and reflect maximum light, as is shown by rays, 700, toward said proximate surface, 100. Components are positioned upon the support pole, 200, such that the light source, 400, is mounted on the pole, 200, between the surface, 100, and the cover, 600. Reflective surface inside cover, 600, faces light source, 400, and increases efficacy of proximate lighting by directing and reflecting light rays, 700, toward the proximate surface, 100. The purpose of all designs is to simultaneously shine light from the L.E.D., 400, upon the proximate surface, 100, and to transmit light through the optical conduit, 500, thereby illuminating remote points beyond the cover, 600. Light projected by conduit, 500, is represented by star-like points of light, 800. The design of the assembled parts result in a novel device that both illuminate proximate surfaces and transmit light through optical conduits which project decorative and functional light remotely, fulfilling objects of this invention. Further discussion of the components follow, as numerous variations and designs are anticipated. Many various sizes, strengths and configurations of a central lighting source, 400, are conceivable, by L.E.D. or any other suitable light which generates adequately bright light. The light source, 400, is always between the cover, 600, and surface, 100, and can be mounted in any fashion on any post, 200, or support of any means which can suit the desired need. For example, if the device is positioned over a ground or floor, legs or a secure post may provide support for the components. On walls, a nail in the wall can be made to hold the device in a similar manner. Mounting can be made by suspension or hanging on a ceiling, or hanging the lighting apparatus in any various application, suspension can be by chain, cord, wire or other known methods in order for apparatus to be secured. Said cover, 600, always reflects and directs light toward whatever proximate surface, 100, upon which the apparatus is present and operating, such as a wall, ceiling, floor, ground or even hanging objects such as a balloon or a kite with surface area. All surfaces can provide locations upon which to mount the lighting device for varied uses. The device is flexible and used in multiple ways and locations, so many variations will be anticipated. To summarize, any means of securing all components in place works.

Figure 2A:
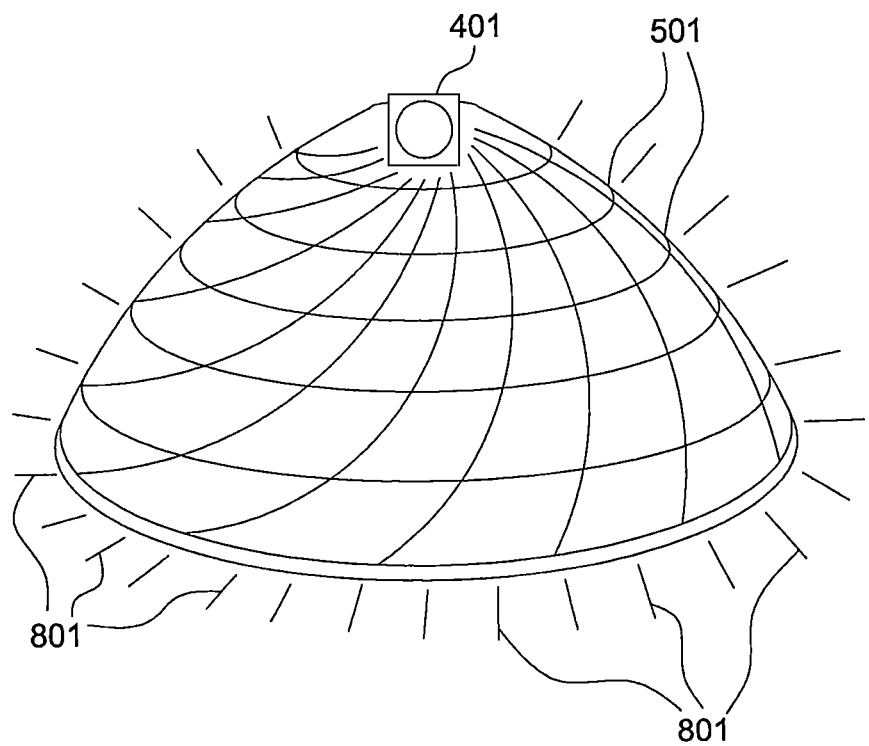
FIG. 2A is a hoop skirt type of lighting effect, made of optically conductive material.
Figure 2B:
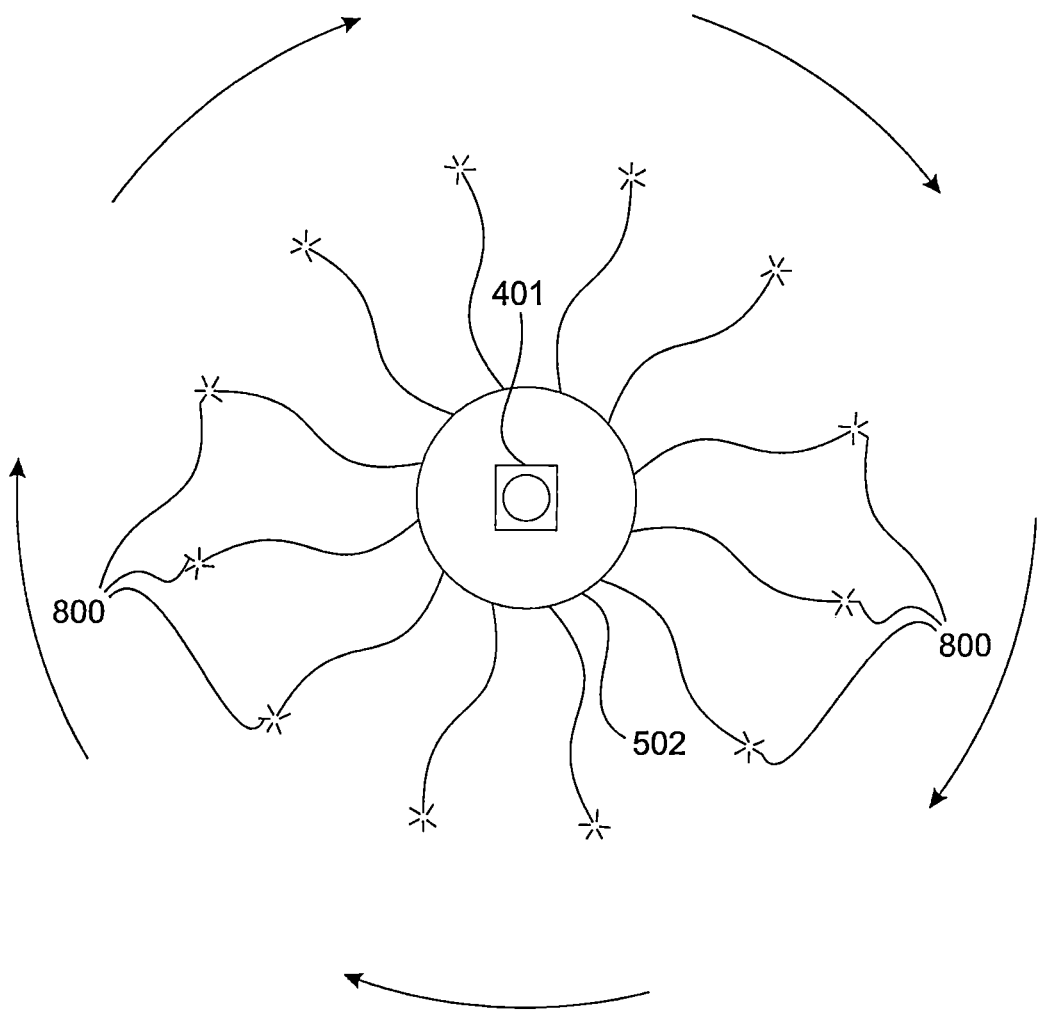
FIG. 2B is a pin-wheel type of lighting effect, made of optically conductive material.
Figure 2C:
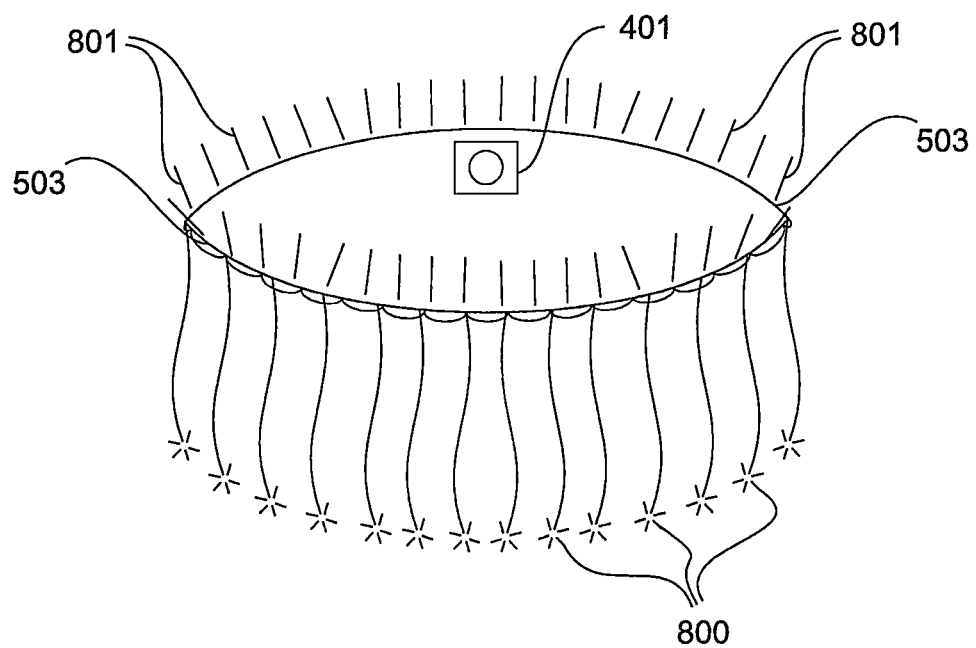
FIG. 2C is a jelly fish-like type of lighting effect, made of optically conductive material.
Figure 3A:
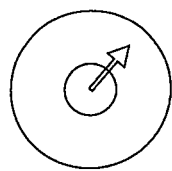
FIGS. 3A), 3B) and 3C) Show various messages on the visible outer cover of the lighting device containing a light source.
Figure 3A:
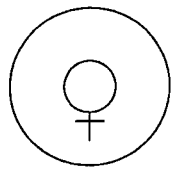
Figure 3A:
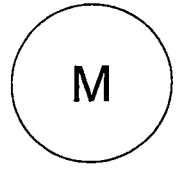
Figure 3A:
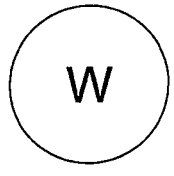
Figure 3B:
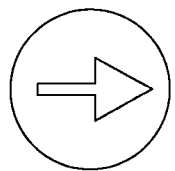
Figure 3B:
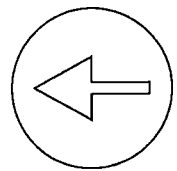
Figure 3C:
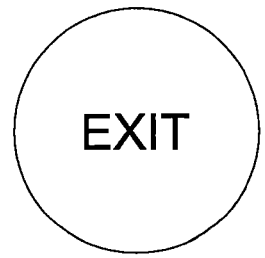

FIGS. 2.A., 2.B., and 2.C. show three anticipated shape formations of light conduit. In these examples, the optical conduits, 501, 502 and 503 are illustrated. All optical conduits are attached integrally to a light source, 401, such as LED. It is assumed a proper power supply, reflective cover and mounting are present in the illustrated examples. Let us examine thicker conduits as well as fiber optics. Thicker optical conduit glows. FIG. 2.A. is light conduit, 501, in a hoop skirt shape. This design employs various optically conductive materials, such as fabric woven of optic fibers, together with a hoop of thicker material of poured or molded acrylic whereby light is guided throughout, shining and glowing to provide remote light, 801.

FIG. 2.B. is light conduit, 502, in a pinwheel design. Thicker material forms a center round luminescent body of optically conductive material having hanging strands of optic fibers. Optical conduit contact to light source, 401, is maintained while spinning, and remote star-like light, 800, emit at fiber tips.

FIG. 2.C. is a light conduit, 503, a body of optically conductive material of jellyfish shape that glows, 801, having hanging strands of optic fibers. Remote star-like light, 800, emit at fiber tips. Various optically conductive designs show decorative and functional light displays remote of the cover.

FIGS. 3.A., 3.B. and 3.C. give a few options for the cover, 600, as it serves to house components and enclose the light source, 400, and the connected optically conductive materials, 500, 501, 502 and 503. In FIG. 1, the cover, 600, on its outward side, is visible to a viewer or bystander. It may be given transparent area or reticulated portions whereby its viewable outer surface displays lighted graphics. The viewable outer cover is opposed to its inner side, and faces away from the surface, 100. This feature may provide additional utility as a sign, indicator or directional arrow. FIG. 3.A. indicates male or female for washrooms. FIG. 3.B. indicates directional signage. FIG. 3.C. is a simple EXIT sign that may be placed in view of observers. Again, it is assumed that all other components are present and operational. These illustrations are intended to show obvious non-novel variations which add functionality. Additional comment regarding the mounting and positioning of components is useful in the understanding of the device.

Being quite flexible in nature the pole, 200, in the preferred embodiment is any form of structure or support means. These are possibly a nail, a bracket, a small or large post, or even solid columns or floating platforms which fulfill the desired needs for the central pole, 200. Said light conduit of whatever form is poised between the cover and surface and extends outwardly. Special note is made to ensure the light conduit material always at least partially contacts the light source optically so as to be lit, conducting light throughout the conduit and projecting remotely therefrom. Conduit extends from the covered area and carries light throughout the optical conduit and to its ends, thereby projecting light remotely. The lighting effects are many and flexible and will be determined by the design of the novel lighting device which simultaneously projects dual distinct lighting effects to proximate surfaces and remotely by conduit.

I claim:

1. A lighting device comprising:
   a reflective cover mounted proximate to a surface;
   a single powered light-emitting diode (LED) disposed within the reflective cover,
   the LED configured to emit light substantially unobstructed except for a portion in integral contact with a light conduit;
   wherein the light conduit is configured to transmit light away from the LED, and extends outward from the reflective cover to enable remote light projection; and
   wherein the reflective cover is configured to contain the LED and the light conduit and to direct light emitted from the unobstructed portion of the LED onto the surface.

2. The lighting device of claim 1, wherein the reflective cover comprises an inner reflective surface shaped to direct light from the LED toward the surface and into the light conduit.

3. The lighting device of claim 1, wherein the light conduit comprises a solid light-transmissive element optically coupled to the LED and extending outwardly from the reflective cover to a distal end.

4. The lighting device of claim 3, wherein the solid light-transmissive element is integrally formed with the reflective cover.

5. The lighting device of claim 1, wherein the LED is oriented such that its primary axis of emission is directed toward the reflective inner surface of the cover.

6. The lighting device of claim 1, wherein the light conduit comprises an optically clear polymeric material.

7. The lighting device of claim 1, wherein the light conduit is configured to emit light laterally along its length as well as at its distal end.

8. The lighting device of claim 1, further comprising a circuit board supporting the LED and disposed within the reflective cover.

9. The lighting device of claim 1, wherein the reflective cover and the light conduit are co-molded as a unitary structure.

10. The lighting device of claim 1, wherein the reflective cover is formed as a cavity having an opening facing the surface to be illuminated.

* * * * *